3,060,060
COATING COMPOSITION
James A. Shotton and Lee O. Edmonds, Bartlesville, Okla., assignors to Phillips Petroleum Company, a corporation of Delaware
No Drawing. Filed Oct. 2, 1958, Ser. No. 764,735
6 Claims. (Cl. 117—132)

This invention relates to a polymeric coating composition. In one of its aspects, this invention relates to an improved coating composition for metal surfaces having excellent wedge bend characteristics and high degree of adhesion. In another aspect, this invention relates to an improved coating composition prepared from a liquid copolymer of a conjugated diene and a vinyl heterocyclic nitrogen base suitable for gas fired curing.

This is a continuation-in-part of our copending application Serial No. 516,336, filed June 17, 1955, now abandoned.

Various coating compositions have been prepared in the past for the purpose of protecting metal surfaces. These coatings were developed to protect metal surfaces from various types of corrosion such as rusting, galvanic action and chemical action. A large amount of work has been carried out in the field of coatings, in particular with respect to coatings for surfaces which will come into contact with food and beverages, i.e., coatings for the interior surfaces of food and beverage cans.

Satisfactory can coatings should have the properties of good flexibility, good adhesion after the canned contents are processed, good hardness, and imparting excellent resistance to sulfide staining. Good flexibility and hardness are necessary because the metal plate is coated with the coating material before the can is fabricated, and the coating should be flexible enough to withstand the stresses to which it will be subjected during this fabrication. As the fabricating machinery is also prone to scratch the coating, the property of hardness is desired. Satisfactory can coatings should have a pencil hardness of at least 3, i.e., the hardness of a pencil lead which will scratch the film. When the contents of the can, such as food, are processed, the coating should have good adhesion after the processing, since the public is not apt to buy canned food or beverages containing small particles of the coating. Since the metals from which can is fabricated are subject to sulfide staining, coatings must remain in form of continuous, adherent film to protect metal from contact with sulfur-containing compounds in foods, etc.

Liquid polymerized conjugated dienes such as liquid polybutadiene and such conjugated dienes polymerized with copolymerizable monomers have come into prominence in recent years as coating materials. While such coatings from these materials have numerous advantages, they are lacking in flexibility, and for this reason, coatings of food containers lined therewith are frequently damaged in fabrication operations.

In our copending application, it is disclosed that a coating composition comprising a liquid polymer of a conjugated diene can be improved in flexibility and wedge bend characteristics if a small amount of 2,2,4- or 2,4,4-trialkyldihydro- or tetrahydroquinoline, or a polymer of same, is incorporated in the liquid polymer.

In the copending application of James A. Shotton, a co-inventor of this application, Serial No. 670,382, filed July 8, 1957, now U.S. Patent No. 2,927,874, issued March 8, 1960, it is disclosed that a metal coating resulting from curing a liquid polymer prepared by copolymerizing per 100 weight parts monomer, 70 to 98 parts of a conjugated diene and 30 to 2 parts of a vinyl heterocyclic nitrogen base has exceptional flexibility and is substantially undamaged when a metal sheet coated with same is fabricated into cans and which maintains its protective properties under processing conditions.

It has now been found when a can coated with a conjubated diene/vinyl heterocyclic nitrogen base copolymer is cured by radiant heat, hot air and the like, the coating is unaffected and exhibits excellent resistance to food processing. However, it has been observed that when the baking step of the coating process is effected in a gas-fired oven, such as those commonly used in commercial can manufacturing operations, the coated containers show diminished resistance to food processing. This problem is not fully understood since there is no appreciable diminution in resistance to fabrication damage.

An object of this invention is to provide a coating composition of superior fabricating properties.

Another object of this invention is to provide a liquid copolymer of a conjugated diene and a vinyl heterocyclic nitrogen base which can be cured in a gas fired furnace.

Another object of this invention is to provide for the modification of liquid polymer of conjugated diene to to produce a superior coating composition.

Still another object of this invention is to provide an improved coating for cans to be used in food processing.

Still another object of this invention is to provide a coated can being particularly suited for processing food which is to be stored therein.

Still other objects, advantages and features of this invention will be apparent to those skilled in the art having been given this disclosure.

It is now discovered that the problem of loss of processing resistance in coatings comprising liquid copolymers of a conjugated diene with a vinyl-substituted heterocyclic nitrogen base when baked in gas-fired ovens is substantially reduced or entirely eliminated when there is incorporated into the coating a small amount, generally in the range between 0.005 and 5.0, preferably between 0.05 and 1.0 part per hundred parts of copolymer of a 2,2,4- or 2,4,4-trialkyldihydro- or tetrahydroquinoline.

The compositions of this invention are particularly suited to coating metal to be fabricated into cans such as tinned plate, terne plate, bonderized steel, or other metal sheets which are used in making metal containers for storing food, beer, oil, and other products. The coating compositions are also useful for coating metal for other purposes and for coating other surfaces such as wood and the like.

The liquid polymers useful in this invention are those liquid polymers prepared by polymerizing, based on 100 parts by weight of monomers, 70 to 98 parts of a conjugated diene containing 4 to 8 carbon atoms and 30 to 2 parts of a compound of the pyridine and quinoline series containing a

substituent where R' is selected from the group consisting of hydrogen and methyl, said liquid polymer having a viscosity in the range of 100 to 6000 Saybolt Furol seconds at 100° F. For application, such a liquid polymer is mixed with a hydrocarbon solvent boiling in the range of 175 to 400° F., the amount of said solvent generally being sufficient to give a solution containing 10 to 70 percent by weight of non-volatile matter. Furthermore, such liquid copolymers can be mixed with a liquid homopolymer of a 4 to 12 carbon containing diene in order to improve the flexibility of a coating using the liquid diene homopolymer.

As those skilled in the art will understand, the conjugated dienes which can be employed are, in addition to 1,3-butadiene, those which contain from 4 to 8, inclusive, carbon atoms per molecule and include isoprene (2-methyl-1,3-butadiene), piperylene, 2-methyl-1,3-pentadiene, 2,3-dimethyl-1,3-butadiene, chloroprene, and others. With a greater number of carbon atoms, the polymerization rate decreases somewhat, and there are so many isomers that it is not practical, with present procedures, to provide pure compounds. However, in a broader aspect of the invention, conjugated dienes having more than 8, such as 12, carbon atoms per molecule can be used, particularly where the presence of various isomeric compounds can be tolerated. Furthermore, various alkoxy, such as methoxy and ethoxy, and cyano derivatives of these conjugated dienes, are also applicable. Thus, dienes, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, and 2,3-diethyl-1,3-octadiene are applicable. Dienes containing 4 to 6 carbon atoms are preferred.

The heterocyclic nitrogen bases which are applicable are those of the pyridine and quinoline series which are copolymerizable with a conjugated diene and contain one

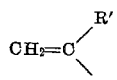

substituent wherein R' is either hydrogen or a methyl group, i.e., the substituent is either a vinyl or an alpha-methylvinyl (isopropenyl) group. The vinyl-substituted heterocyclic nitrogen bases of the pyridine and quinoline series which are preferred are those having only one

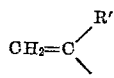

substituent and of these compounds, those belonging to the pyridine series are most frequently used. Various alkyl-substituted derivatives can also be used but it is generally preferred that the total number of carbon atoms in the nuclear-substituted groups, in addition to the vinyl or alpha-methylvinyl, should not be greater than 12 and most frequently these alkyl substituents are methyl and/or ethyl.

These heterocyclic nitrogen bases have the formula

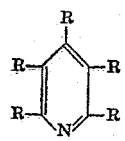

or

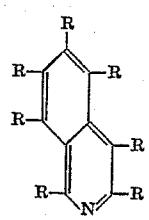

where R is selected from the group consisting of hydrogen, alkyl, vinyl, alpha-methylvinyl, alkoxy, halo, hydroxy, cyano, aryloxy, aryl, and combinations of these groups such as haloalkyl, alkaryl, hydroxyaryl, and the like; one and only one of these groups being selected from the group consisting of vinyl and alpha-methylvinyl; and the total number of carbon atoms in the nuclear substituted groups, in addition to the vinyl or alpha-methylvinyl group, being not greater than 12. Examples of such compounds are 2-vinylpyridine; 2-vinyl-5-ethylpyridine; 2-methyl-5-vinylpyridine; 4-vinylpyridine; 2,3,4 - trimethyl - 5 - vinylpyridine; 3,4,5,6 - tetramethyl-2-vinylpyridine; 3-ethyl-5-vinylpyridine; 2,6-diethyl-4-vinylpyridine; 2 - isopropyl - 4 - nonyl - 5 - vinylpyridine; 2 - methyl - 5 - undecyl - 3 - vinylpyridine; 2,4 - dimethyl - 5,6 - dipentyl - 3 - vinylpyridine; 2 - decyl - 5 - (alpha - methylvinyl)pyridine; 2 - vinyl - 3 - methyl - 5 - ethyl - pyridine; 2 - methoxy - 4 - chloro - 6 - vinylpyridine; 3 - vinyl-5-ethoxypyridine; 2-vinyl-4,5-dichloropyridine; 2-(alpha - methylvinyl) - 4 - hydroxy - 6 - cyanopyridine; 2 - vinyl - 4 - phenoxy - 5 - methylpyridine; 2 - cyano - 5 - (alpha - methylvinyl)pyridine; 3 - vinyl - 5 - phenyl - pyridine; 2 - (para - methylphenyl) - 3 - vinyl - 4 - meth - ylpyridine; 3 - vinyl - 5 - (hydroxyphenyl)pyridine; 2 - vinylquinoline; 2-vinyl-4-ethylquinoline; 3-vinyl-6,7-di-n-propylquinoline; 2-methyl-4-nonyl-6-vinylquinoline; 4-(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline; 3-vinyl-5,6-dichloroisoquinoline; 2-vinyl-6-ethoxy-7-methylquinoline; 3-vinyl-6-hydroxymethylisoquinoline; and the like.

The liquid polymers employed in our invention are those which have a viscosity between 100 and 6000 Saybolt Furol seconds at 100° F. Improved can coatings can be obtained by polymerizing by either mass or emulsion polymerization although we prefer to use polymers prepared by mass polymerization in the presence of an alkali metal catalyst, a suitable method for such polymerization being that described in Crouch 2,631,175. When emulsion polymerization is used, standard synthetic rubber recipes are used except for the inclusion in the recipe of larger amounts of the mercaptan modifier. Suitable liquid polymers can be obtained using 2 to 7 parts of a mercaptan modifier such as tertiary-dodecyl mercaptan.

The trialkyl quinolines useful in this invention are the 2,2,4 or 2,4,4-alkyl-substituted quinolines wherein each alkyl can be the same or different, and each alkyl will contain not more than 3 carbon atoms. The quinoline can be dihydro- or tetrahydroquinoline, and these materials can be used in the polymeric or monomeric form. Such compounds can be represented by the following structural formulas:

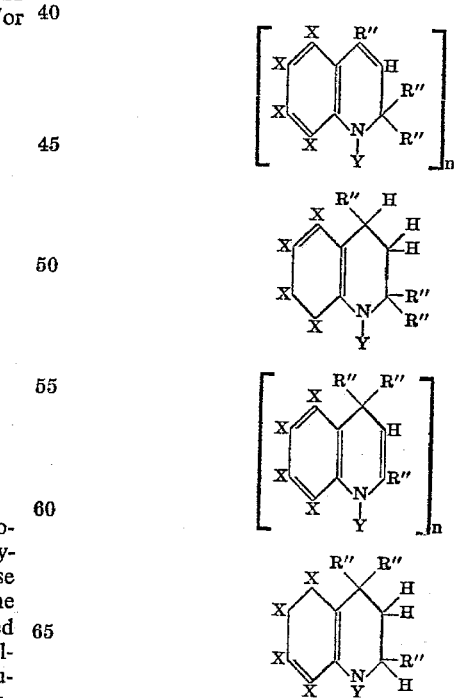

wherein R" is an alkyl radical containing 1 to 3 carbon atoms, X is selected from the group consisting of hydrogen, alkyl, aryl, alkaryl, aralkyl, cycloalkyl, alkoxy and aryloxy radicals of not more than 16 carbon atoms and Y is selected from the group consisting of hydrogen, alkyl, aryl, alkaryl, aralkyl, and cycloalkyl radicals of not more than 16 carbon atoms and $n$ is an integer of at least 1. That is, these compounds are selected from the group consisting of 2,2,4-trialkyl-1,2-dihydroquinoline, 2,2,4-trialkyl-1,2,3,4-tetrahydroquinoline, 2,4,4-trialkyl-1,4-dihydroquinoline and 2,4,4-trialkyl-1,2,3,4-tetrahydroquinoline wherein each alkyl substituent as indicated contains 1 to 3 carbon atoms, alkyl, aryl, alkaryl, aralkyl, cycloalkyl, alkoxy and aryloxy derivatives of the foregoing and polymers of the foregoing dihydroquinolines and where the number of carbon atoms in any radical does not exceed 16.

Some examples of compounds of the above general formulas which are useful in the amounts set forth below as additives for coatings by the method of this invention are:

2,2,4-trimethyl-1,2-dihydroquinoline
2,2,4-trimethyl-1,2,3,4-tetrahydroquinoline
2,4,4-triethyl-1,4-dihydroquinoline
2,4,4-triethyl-1,2,3,4-tetrahydroquinoline
2,2-diethyl-4-n-propyl-1,2-dihydroquinoline
2-isopropyl-4,4-dimethyl-1,2,3,4-tetrahydroquinoline
2-ethyl-2-methyl-4-n-propyl-1,2-dihydroquinoline
6-phenyl-2,2,4-trimethyl-1,2-dihydroquinoline
6-ethoxy-2,2,4-trimethyl-1,2-dihydroquinoline
6-dodecyl-2,2,4-trimethyl-1,2-dihydroquinoline
5-phenyl-2,4,4-triethyl-1,4-dihydroquinoline
5 - methyl - 7 - cyclohexane - 2,4,4 - tripropyl - 1,4 - dihydroquinoline
6,8-dimethoxy-2,2,4-trimethyl-1
2,3,4-tetrahydroquinoline
6-phenoxy-2,2,4-triethyl-1,2-dihydroquinoline
7-hexadecyl-2,2,4-trimethyl-1,2,3,4-tetrahydroquinoline
N-phenyl-2,2,4-trimethyl-1,2-dihydroquinoline
5-(p-tolyl)-2,4,4-tripropyl-1,4-dihydroquinoline and
8-benzyl-2,4,4-triethyl-1,2,3,4-tetrahydroquinoline and polymers of the foregoing dihydroquinolines. These materials may be prepared by various methods, some examples of which are disclosed in U.S. Patents 2,064,752 and 2,500,229.

It will be understood by those skilled in the art that the particular hydroquinoline to be effective must be comparatively non-volatile at the film curing condition for the material to be effective. That is, some of the hydroquinolines are substantially 100 percent volatile at the usual film curing temperature and if these compounds are to be used, the curing temperature must be reduced accordingly.

The amount of these compounds which may be added to liquid polymer coating compositions to bring about the improvements of this invention should be in the range from 0.005 to 5 percent by weight of the liquid polymer. A more preferred range is from 0.05 to 1 percent by weight.

This new coating composition is conveniently prepared in the form of a solution which can be applied to metal surfaces by means of roller coating, spraying, brushing or dipping. Suitable solvents include both the aromatic and aliphatic hydrocarbons, some examples of which are toluene, xylene, benzene, Stoddard solvent, mineral spirits, naphtha, and the like. The amount of solvent used will vary, depending upon such factors as the nature of the polymers employed and the method of application to metal surfaces. Generally the amount of solvent is adjusted to give a solution containing in the range between 10 to 70 percent by weight non-volatile matter.

Since the stabilizers of this invention have low solubility in paraffin hydrocarbon, a preferred procedure when such solvents are used is to introduce them as a solution in benzene, xylene, toluene, or other aromatic hydrocarbon. When operating in the absence of a solvent, the liquid copolymer is heated to a temperature somewhat above the melting point of the additive under which conditions the stabilizer is readily miscible therewith. Generally the temperature will be from about 200 to 300° F.

Following the application of the coating composition, the coated metal is baked in the presence of the combustion products of a gas flame at a temperature in the range between about 100 and 900° F., preferably in the range between 350 and 450° F. The baking time will be dependent upon temperature and can vary from a few seconds to several hours, e.g. as the baking temperature is increased, the time can be shortened. Generally from 3 to 30 minutes at a temperature in the range 350 to 450° F. is satisfactory.

These compositions are particularly suitable for coating sheet metal such as tin coated steel, terne plate, bonderized steel, or other thin metal sheet used in making metal containers for storage of food, beverages, oil, paints, and the like and the can can be used on both the interior and exterior of such containers. They can also be used to coat barrels, pipe, and the like.

The amount of these new coating compositions which should be applied, i.e., the film weight, will vary depending upon the type of surface which is to be protected. When thin metal surfaces such as the metal for cans and the like are to be protected, it is preferable that the film weight be low, and in general, will vary in the range from one to ten milligrams per square inch. For other types of coatings such as are applied to pipes, tubing, barrels and the like, heavier coatings say up to 25 milligrams per square inch or higher can be employed.

I will further describe my invention and illustrate its advantages by the following examples.

TEST PROCEDURES

Tests for defects arising in fabrication of can ends, the presence or absence of such defects being largely dependent on flexibility of the coating, were made by immersing the can end, after degreasing with solvent naphtha, in an acid copper sulfate solution made up of 20 parts copper sulfate pentahydrate, 10 parts concentrated hydrochloric acid, and 70 parts distilled water, for two minutes. The test specimens were then washed thoroughly with water and dried. The ratings were made by comparison with rated ends supplied by Continental Can Company, a rating of 100 being perfect, a rating of zero indicating continuous breaks in the coating.

Tests for processing durability using pumpkin were made by blending the pumpkin to give a homogeneous mixture and filling the cans to leave a head space of from ⅜ to ½ inch. The cans were then closed using an Automatic Master Sealer made by Automatic Sealing Devices Company of Manitowoc, Wisconsin. The second operation roll of the double seamer was disengaged and the tops closed with the first operation roll. The cans were then placed under steam pressure and heated until the pressure was 10 p.s.i.g. The pressure was blown down and the cans removed and allowed to cool for two or three minutes after which the first operation roll was disengaged and sealing of the tops completed using the second operation roll. The sealed cans were returned to the pressure cooker and processed at 15 p.s.i.g. steam pressure for 75 minutes. The cans were then removed, cooled and aged 24 hours after which tops and bottoms were removed with a cutting wheel attachment on the sealer, washed, and dried. Immediately after drying, the coating was given an "X" scratch with a sharp instrument. A piece of cellophane tape was pressed across the scratch and jerked off to determine whether the coating had loosened. The shoulder or countersink was examined for cracks, pinholes, and loss of adhesion, rating being made by the Continental Can end scale as was used in the acid copper sulfate test.

The oxygenated spinach test was made by pureeing spinach from cans using a Waring Blendor. Oxygen was bubbling through the pureed spinach for 30 minutes after which it was transferred to the test cans, leaving a head space of ⅜ to ½ inch. The test ends were then seamed on, the cans inverted, and a small hole punched in the bottom of each. The cans were then placed, bottom up, in an evacuation chamber and slowly evacuated to about 25 inches of mercury pressure. Oxygen was then admitted to the chamber until the system was at atmospheric pressure. The evacuation and oxygenation cycle was repeated twice after which the cans were removed, the holes in the bottoms sealed with solder, and placed with the test ends upward in a pressure cooker where they were processed for one hour at 10 p.s.i.g. of steam.

The tops were then removed with a cutter and washed with water, rubbing with a rubber finger stall during washing, after which they were bent across one diameter and the bent edge rubbed with the rubber finger stall. The bend was then straightened and the top bent on a diameter at right angles to the first bend and again rubbed along the bend as before. After straightening, the surface was examined and the portion of the coating removed estimated as a percent of total.

*Example I*

A coating composition was prepared by dissolving 60 parts liquid butadiene-2-methyl-5-vinylpyridine copolymer (3.7 percent MVP) in 40 parts mineral spirits. Electrolytic tin plate (0.25 pound tin per base box) was coated with this composition using a Wagner Litho Laboratory model roller coater to provide a coating having a film weight of 5±0.5 milligrams per square inch. A portion of the plate so coated was baked at 390° F. in a gas-fired oven for 13 minutes, another portion at the same temperature in an electrically heated oven for the same length of time. Can ends were then punched from the coated plate so prepared. A portion of these can ends were tested for defects in the coating arising from fabrication and a portion made up into food cans for processing tests with pumpkin and oxygenated spinach. Results of these tests are shown below.

TABLE I

| Oven | Electric | Gas |
| --- | --- | --- |
| Temperature, F | 390 | 390 |
| Time, minutes | 13 | 13 |
| Fabrication evaluation, percent | 95 | 95 |
| Pumpkin Processing: | | |
| Adhesion (tape), top and bottom | 100 | 100 |
| Top rating [1] | 93.5 | 86 |
| Bottom rating [1] | 95.0 | 87.5 |
| Oxygenated Spinach, Top rating [1] | 99 | 98 |

[1] Average of six tests.

This study demonstrates the loss in effectiveness of a butadiene-MVP copolymer coating when baked on tin plate in a gas-fired oven.

*Example II*

A coating composition was prepared by mixing a liquid copolymer of 2-methyl-5-vinylpyridine with butadiene (same as used in Example I) with mineral spirits to provide a 60 percent solution. To 500 grams of this solution was added 0.3 gram (0.1 percent) of Agerite Resin-D (polytrimethyl dihydroquinoline) in 5.0 ml. toluene. Electrolytic tin plate (same as in Example I) was coated with a roller coater to provide a film weight of 5.2 mg./sq. in. The plate was baked in a gas-fired oven at 390° F. and can ends punched out for testing (sample A).

Another 60 percent solution of the same copolymer in mineral spirits was coated on electrolytic tin plate (same as before) with a roller coater to provide a coating having a film weight of 5.8 mg./sq. in. The coated plate was baked in a gas-fired oven at 390° F. and can ends punched out for testing (sample B).

Data on the tests are shown in Table II.

TABLE II

| | Sample | |
| --- | --- | --- |
| | A | B |
| Stabilizer, percent | 0.1 | |
| Bake Temperature, ° F | 390 | 390 |
| Bake Time, minutes | 13 | 13 |
| Fabrication evaluation, percent | 95 | 95 |
| Pumpkin Processing: | | |
| Adhesion (tape) Top and Bottom | 100 | 100 |
| Top Rating [1] | 92 | 82 |
| Bottom Rating [1] | 91 | 81 |
| Oxygenated Spinach, Top Rating | [2] 96 | [1] 95 |

[1] Average of 5.
[2] Average of 4.

*Example III*

A coating composition was made up from the same materials and in the same manner as that used in preparing sample A in Example II except that 0.75 gram (0.25 percent) Agerite-D in 30 ml. toluene was used. The tin plate was coated to provide a film weight of 5.1 mg./sq. in. The coated metal was baked at 390° F. in a gas-fired oven and can ends punched out for testing (sample C).

Another coating composition, corresponding to that used in sample B in Example I, was prepared using no stabilizer, coated on one-fourth pound tin plate as before, to provide a coating having a film weight of 5.2 mg./sq. in. The coated plate was baked in a gas-fired oven at 390° F. and can ends punched out for testing.

Test data are shown in the Table III.

TABLE III

| | Sample | |
| --- | --- | --- |
| | A | B |
| Stabilizer, percent | 0.25 | |
| Bake Temperature, ° F | 390 | 390 |
| Bake Time, minutes | 13 | 13 |
| Fabrication Evaluation, percent | 95 | 95 |
| Pumpkin Processing: | | |
| Adhesion (tape) Top and Bottom | 100 | 100 |
| Top Rating [1] | 93 | 86 |
| Bottom Rating [1] | 94 | 85 |

[1] Average of 5 tests.

We claim:

1. A method of coating a metal surface which comprises preparing a liquid coating composition by passing into a mixing zone a liquid copolymer prepared from a monomer system consisting essentially of, based on 100 parts by weight of monomer, 70 to 98 parts of a conjugated diene containing 4 to 12 carbon atoms and 30 to 2 parts of a compound selected from the group consisting of pyridines and quinolines containing a

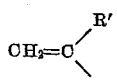

substituent wherein R' is selected from the group consisting of hydrogen and methyl, said liquid copolymer having a viscosity in the range 100 to 6000 Saybolt Furol seconds at 100° F., admixing therewith 0.005 to 3 weight parts per hundred parts of said liquid copolymer of a compound having a molecular formula selected from the group consisting of

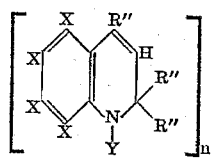

3,060,060

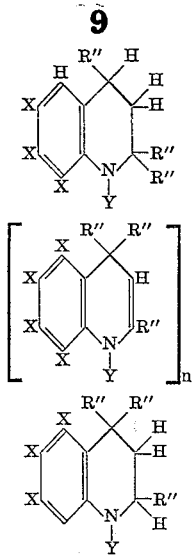

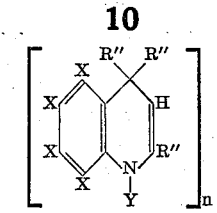

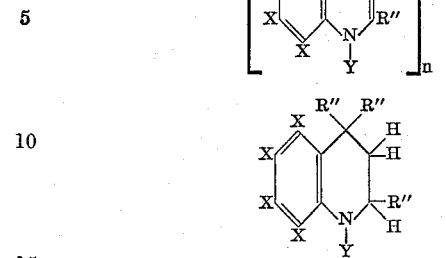

wherein R″ is an alkyl radical containing 1 to 3 carbon atoms, each X selected from the group consisting of hydrogen, alkyl, aryl, alkaryl, aralkyl, cycloalkyl, alkoxy, and aryloxy radicals of not more than 16 carbon atoms, Y selected from the group consisting of hydrogen, alkyl, aryl, alkaryl, aralkyl and cycloalkyl of not more than 16 carbon atoms and n an integer of at least 1, coating a metal surface with said liquid coating composition from said mixing zone, and baking the coated metal surface in a reducing atmosphere.

3. A method of coating a metal surface which comprises preparing a liquid coating composition by passing into a mixing zone a liquid copolymer prepared from a monomer system consisting essentially of, based on 100 parts by weight of monomer, 70 to 98 parts of a conjugated diene containing 4 to 12 carbon atoms and 30 to 2 parts of a compound selected from the group consisting of pyridines and quinolines containing a

substituent wherein R′ is selected from the group consisting of hydrogen and methyl, said liquid copolymer having a viscosity in the range 100 to 6000 Saybolt Furol seconds at 100° F., admixing therewith a paraffin hydrocarbon sufficient to give a solution containing 10 to 70 percent by weight of non-volatile matter, introducing into said solution and admixing therewith a second solution comprised of a stabilizing compound dissolved in an aromatic hydrocarbon, said stabilizing compound having a molecular formula selected from the group consisting of

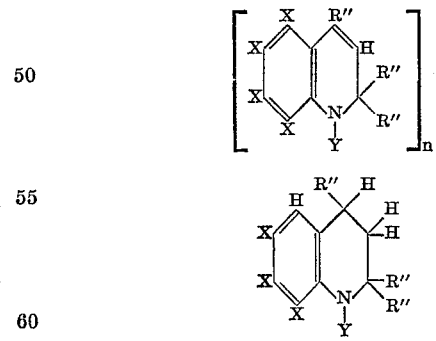

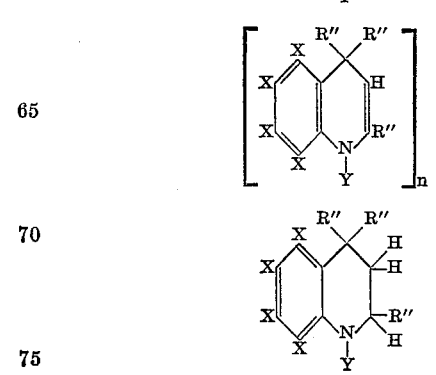

wherein R″ is an alkyl radical containing 1 to 3 carbon atoms, each X selected from the group consisting of hydrogen, alkyl, aryl, alkaryl, aralkyl, cycloalkyl, alkoxy, and aryloxy radicals of not more than 16 carbon atoms, Y selected from the group consisting of hydrogen alkyl, aryl, alkaryl, aralkyl, and cycloalkyl of not more than 16 carbon atoms and n an integer of at least 1, maintaining the temperature of said mixing zone above the melting point of said compound, coating a metal surface with said liquid coating composition from said mixing zone, and baking the coated metal surface in a reducing atmosphere.

2. A method of coating a metal surface which comprises preparing a liquid coating composition by passing into a mixing zone a liquid copolymer prepared from a monomer system consisting essentially of, based on 100 parts by weight of monomer, 70 to 98 parts of a conjugated diene containing 4 to 12 carbon atoms and 30 to 2 parts of a compound selected from the group consisting of pyridines and quinolines containing a

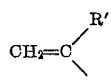

substituent wherein R′ is selected from the group consisting of hydrogen and methyl, said liquid copolymer having a viscosity in the range 100 to 6000 Saybolt Furol seconds at 100° F., admixing therewith an aromatic hydrocarbon solvent sufficient to give a solution containing 10 to 70 percent by weight of non-volatile matter, introducing into said solution and admixing therewith 0.005 to 3 weight parts per 100 parts of said liquid copolymer of a compound having the molecular formula selected from the group consisting of

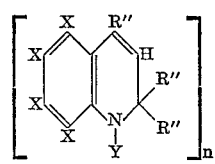

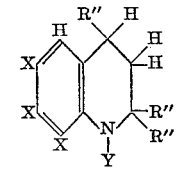

wherein R" is an alkyl radical containing 1 to 3 carbon atoms, each X selected from the group consisting of hydrogen, alkyl, aryl, alkaryl, aralkyl, cycloalkyl, alkoxy, and aryloxy radicals of not more than 16 carbon atoms, Y selected from the group consisting of hydrogen, alkyl, aryl, alkaryl, aralkyl, and cycloalkyl of not more than 16 carbon atoms and $n$ an integer of at least 1 coating a metal surface with said liquid coating composition from said mixing zone, and baking the coated metal surface in a reducing atmosphere.

4. A method of coating a metal surface which comprises preparing a liquid coating composition by passing into a mixing zone a liquid copolymer prepared from a monomer system consisting essentially of, based on 100 parts by weight of monomer, 70 to 98 parts of a conjugated diene containing 4 to 12 carbon atoms per molecule and 30 to 2 parts of a compound selected from the group consisting of pyridines and quinolines containing a

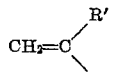

substituent wherein R' is selected from the group consisting of hydrogen and methyl, said liquid copolymer having a viscosity in the range of 100 to 6000 Saybolt Furol seconds at 100° F., introducing into said liquid copolymer and admixing therewith 0.005 to 3 weight parts per 100 parts of said liquid copolymer of a compound having the molecular formula selected from the group consisting of

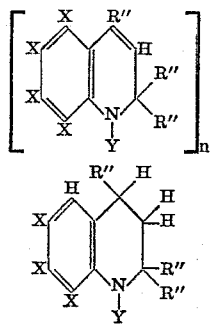

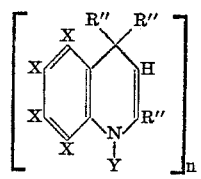

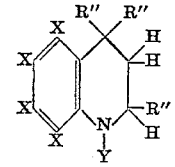

wherein R" is an alkyl radical containing 1 to 3 carbon atoms, each X is selected from the group consisting of hydrogen, alkyl, aryl, alkaryl, aralkyl, cycloalkyl, alkoxy and aryloxy radicals of not more than 16 carbon atoms, Y is selected from the group consiting of hydrogen, alkyl, aryl, alkaryl, aralkyl, and cycloalkyl of not more than 16 carbon atoms and $n$ is an integer of at least 1, coating a metal surface with said liquid coating composition from said mixing zone, and baking the coated metal surface in a reducing atmosphere.

5. The process of claim 4 wherein the baking is conducted in the presence of the combustion products of a gas flame and baking temperature is in the range of 100 to 900° F.

6. The process of claim 4 wherein the baking is conducted in the presence of the combustion products of a gas flame and baking temperature is in the range of 350 to 450° F.

References Cited in the file of this patent
UNITED STATES PATENTS

| | | |
|---|---|---|
| 2,500,597 | Arnold et al. | Mar. 14, 1950 |
| 2,514,648 | Kehe | July 11, 1950 |
| 2,681,331 | Howland et al. | June 15, 1954 |
| 2,757,162 | Howland et al. | July 31, 1956 |
| 2,855,376 | Shotton et al. | Oct. 7, 1958 |
| 2,866,779 | Pritchard et al. | Dec. 30, 1958 |